(12) United States Patent
Pasquetto (10) Patent No.: US 7,261,502 B2
(45) Date of Patent: Aug. 28, 2007

(54) NUMERIC/CONTROL MACHINE

(75) Inventor: Franco Pasquetto, Cadoneghe (IT)

(73) Assignee: O.M.V. Officine Meccaniche Venete S.r.l. (IT)

( * ) Notice: Subject to any disclaimer, the term of this patent is extended or adjusted under 35 U.S.C. 154(b) by 0 days.

(21) Appl. No.: 10/563,307

(22) PCT Filed: Jun. 30, 2004

(86) PCT No.: PCT/IB2004/002177

§ 371 (c)(1),
(2), (4) Date: Jun. 5, 2006

(87) PCT Pub. No.: WO2005/002786

PCT Pub. Date: Jan. 13, 2005

(65) Prior Publication Data

US 2006/0228182 A1 Oct. 12, 2006

(30) Foreign Application Priority Data

Jul. 1, 2003 (IT) .......................... TO2003A0502

(51) Int. Cl.
*B23C 1/12* (2006.01)
(52) U.S. Cl. ...................... 409/201; 409/235
(58) Field of Classification Search ................ 409/201, 409/204, 211, 212, 216, 235, 80, 131, 134, 409/145, 164, 183, 132; 408/129, 130, 234, 408/236; 248/371, 398, 155.2, 155.4, 155.5; 414/735; 901/28, 29, 39, 31, 15; 74/490.01, 74/490.03, 490.05, 490.06, 490.07, 490.08, 74/490.13

See application file for complete search history.

(56) References Cited

U.S. PATENT DOCUMENTS

| | | | | |
|---|---|---|---|---|
| 4,988,244 A | * | 1/1991 | Sheldon et al. | 409/132 |
| 5,388,935 A | * | 2/1995 | Sheldon | 409/201 |
| 5,401,128 A | * | 3/1995 | Lindem et al. | 409/132 |
| 5,538,373 A | * | 7/1996 | Kirkham | 409/131 |
| 5,575,597 A | * | 11/1996 | Bailey et al. | 409/201 |
| 5,715,729 A | * | 2/1998 | Toyama et al. | 74/490.03 |
| 5,787,758 A | * | 8/1998 | Sheldon | 74/490.07 |
| 5,906,461 A | * | 5/1999 | Lunz et al. | 409/201 |
| 5,919,014 A | * | 7/1999 | Weck et al. | 409/201 |
| 6,048,143 A | * | 4/2000 | Chang et al. | 409/201 |

(Continued)

FOREIGN PATENT DOCUMENTS

WO WO9932256 A1 * 7/1999

*Primary Examiner*—Dana Ross
(74) *Attorney, Agent, or Firm*—Sheridan Ross P.C.

(57) ABSTRACT

Described herein is a nNumeric-control machine (1) comprising: a flatbed (2) provided with a horizontal working surface (3), on which a workpiece (4) is to be positioned; a machining head (5) which is able to move in space above the working surface (3), and a supporting structure (6), which is designed to support and displace the machining head (5) in space above the working surface (3), the supporting structure (6) consisting of: a floating platform (7) mounted so that it can move above the working surface (3), a series of articulated supporting arms (8) designed to support the floating platform (7) above the working surface (3) on opposite sides of the platform itself, and members for moving (13, 14) capable of displacing upon command and independently the articulated arms (8), each articulated arm (8) being designed to connect the flatbed (2) of the machine with the overlying floating platform (7).

7 Claims, 5 Drawing Sheets

U.S. PATENT DOCUMENTS

| | | | |
|---|---|---|---|
| 6,059,703 A * | 5/2000 | Heisel et al. | 483/31 |
| 6,099,217 A * | 8/2000 | Wiegand et al. | 409/201 |
| 6,155,758 A * | 12/2000 | Wieland et al. | 409/201 |
| 6,161,992 A * | 12/2000 | Holy et al. | 409/134 |
| 6,241,437 B1 * | 6/2001 | Wieland | 409/201 |
| 6,336,778 B1 * | 1/2002 | Saenz et al. | 409/201 |
| 6,402,444 B1 * | 6/2002 | Wang et al. | 409/235 |
| 6,540,458 B1 * | 4/2003 | Ponisch | 409/201 |
| 6,575,676 B2 * | 6/2003 | Wang et al. | 409/201 |

* cited by examiner

NUMERIC/CONTROL MACHINE

TECHNICAL FIELD

The present invention relates to a numeric-control machine.

In particular, the present invention relates to a numeric-control machine tool, such as, for example, a numeric-control milling machine, to which the ensuing treatment will make explicit reference without this however implying any loss of generality.

BACKGROUND ART

As is known, the majority of currently known numeric-control milling machines comprises: a bottom flatbed provided with a horizontal working surface, on which a workpiece is to be positioned; a cutterhead that can move above the working surface in such a way as to be able to carry out milling of the workpiece which is kept stationary on the working surface itself; and, finally, a supporting structure designed to support and displace the cutterhead in space above the working surface in such a way as to enable it to perform all the displacements necessary for carrying out the programmed machining operations.

In the majority of currently known numeric-control milling machines, the supporting structure of the cutterhead consists of: a portal having the shape of a U set upside down, mounted so that it can move on the flatbed of the machine tool in such a way that its horizontal cross member is set astride of the working surface, in a direction perpendicular to the longitudinal axis of the latter; and a head-carrying turret which is mounted mobile on the horizontal cross member of the portal in such a way as to be able to move horizontally in a direction perpendicular to the longitudinal axis of the aforesaid working surface.

The portal can be displaced along the flatbed of the machine tool in a direction parallel to the longitudinal axis of the working surface, thus maintaining the horizontal cross member parallel to itself and perpendicular to the longitudinal axis of the working surface, whilst the cutterhead is mounted mobile on the bottom end of the turret in such a way as to be able to move both in a slewing fashion and in a vertical direction.

Of course, the numeric-control milling machines that adopt the above structural configuration require the use of very rigid portals so as to eliminate any possible errors of spatial positioning of the tool deriving from possible structural deformations of the portal.

Unfortunately, however, the portals that have a structural stiffness adequate for the purpose are intrinsically very heavy and costly, with all the drawbacks that this entails. The use of very heavy portals involves, moreover, the use of electric motors with high specific power, which are particularly costly and present high levels of consumption in terms of electric power, thus contributing to raising the costs of production of the mechanical pieces made with said machines.

DISCLOSURE OF INVENTION

The purpose of the present invention is hence to provide a numeric-control machine tool which will have a lighter structure as compared to the currently known ones, in such a way as to prevent the drawbacks described above.

According to the present invention, a numeric-control machine is provided, which comprises: a flatbed provided with a horizontal working surface on which a workpiece is to be positioned; a machining head, which is able to move in space above the working surface; and a supporting structure, which is designed to support and displace said machining head in space above the working surface; said machine being characterized in that said supporting structure comprises a floating platform mounted so that it can move above the working surface, and a plurality of articulated supporting arms designed to support the floating platform above the aforesaid working surface on opposite sides of the platform; each articulated arm being mobile in a vertical plane and being designed to connect the flatbed of the machine with the overlying floating platform.

BRIEF DESCRIPTION OF THE DRAWINGS

The present invention will be now described with reference to the annexed plate of drawings, which illustrate a non-limiting example of embodiment thereof, and in which.

BEST MODE FOR CARRYING OUT THE INVENTION

Figure 1:
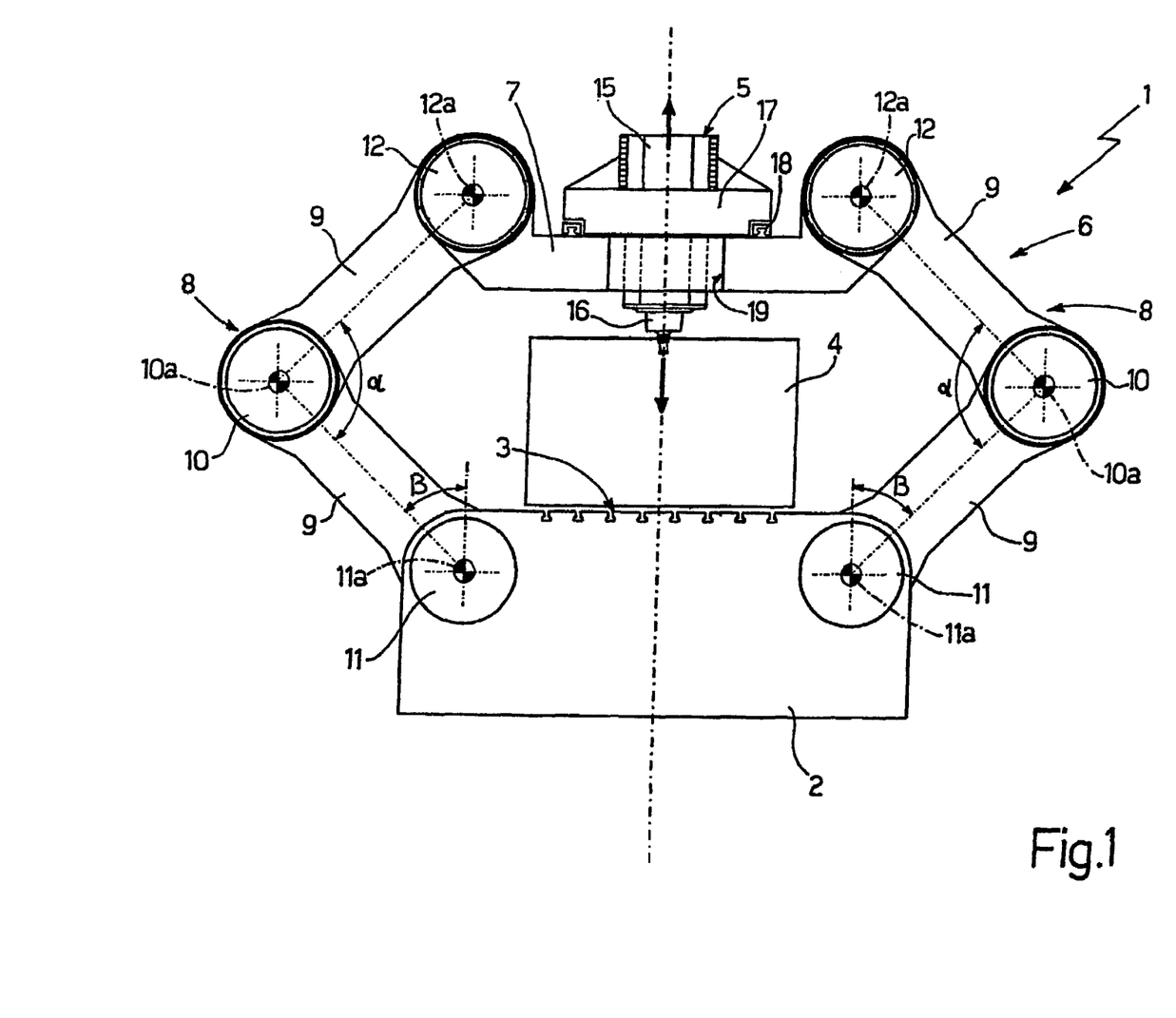
FIG. 1 is a front view of a numeric-control machine tool made according to the teachings of the present invention.
Figure 2:
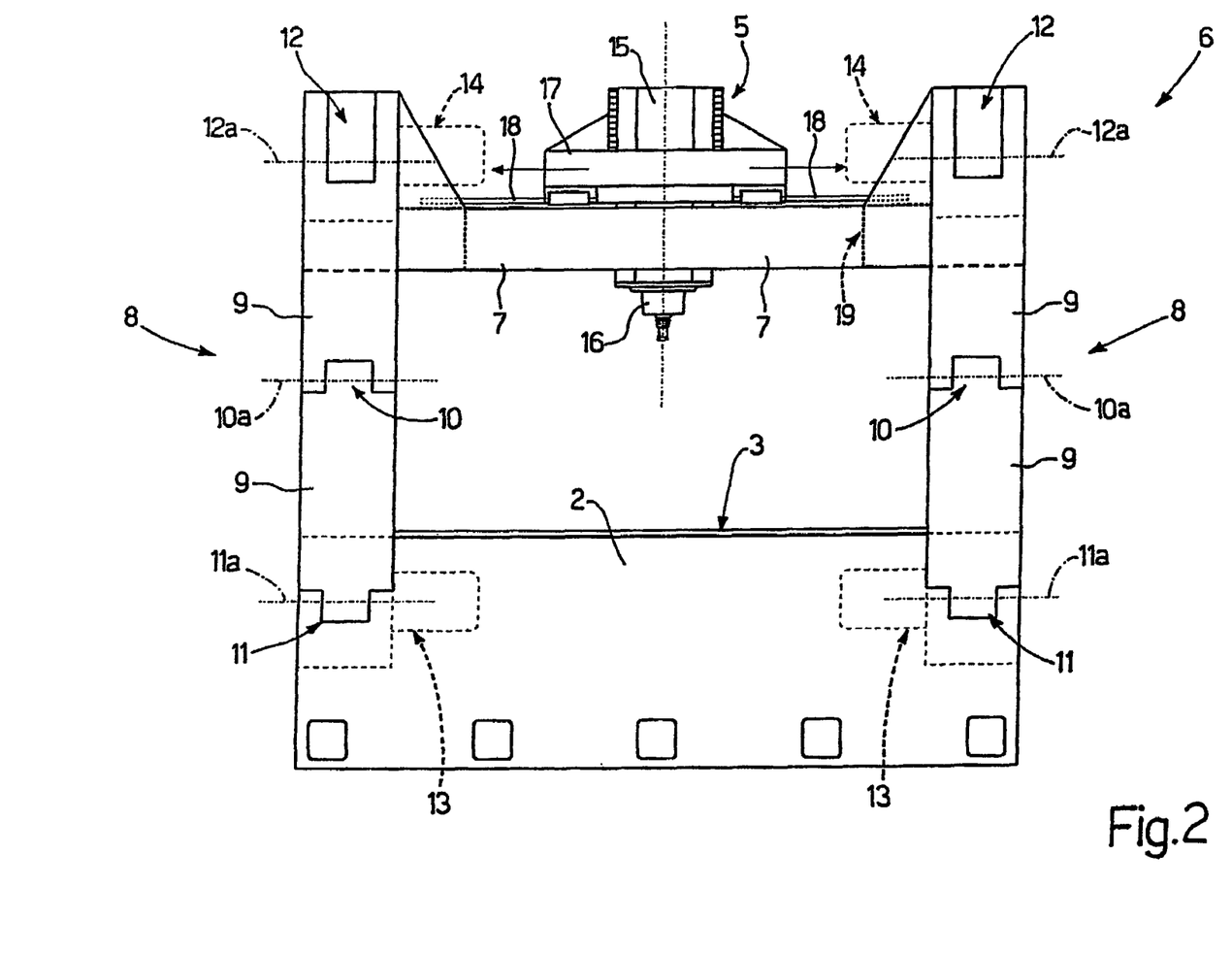
FIG. 2 is a side view of the machine tool illustrated in FIG. 1, with parts removed for reasons of clarity.
Figure 3:
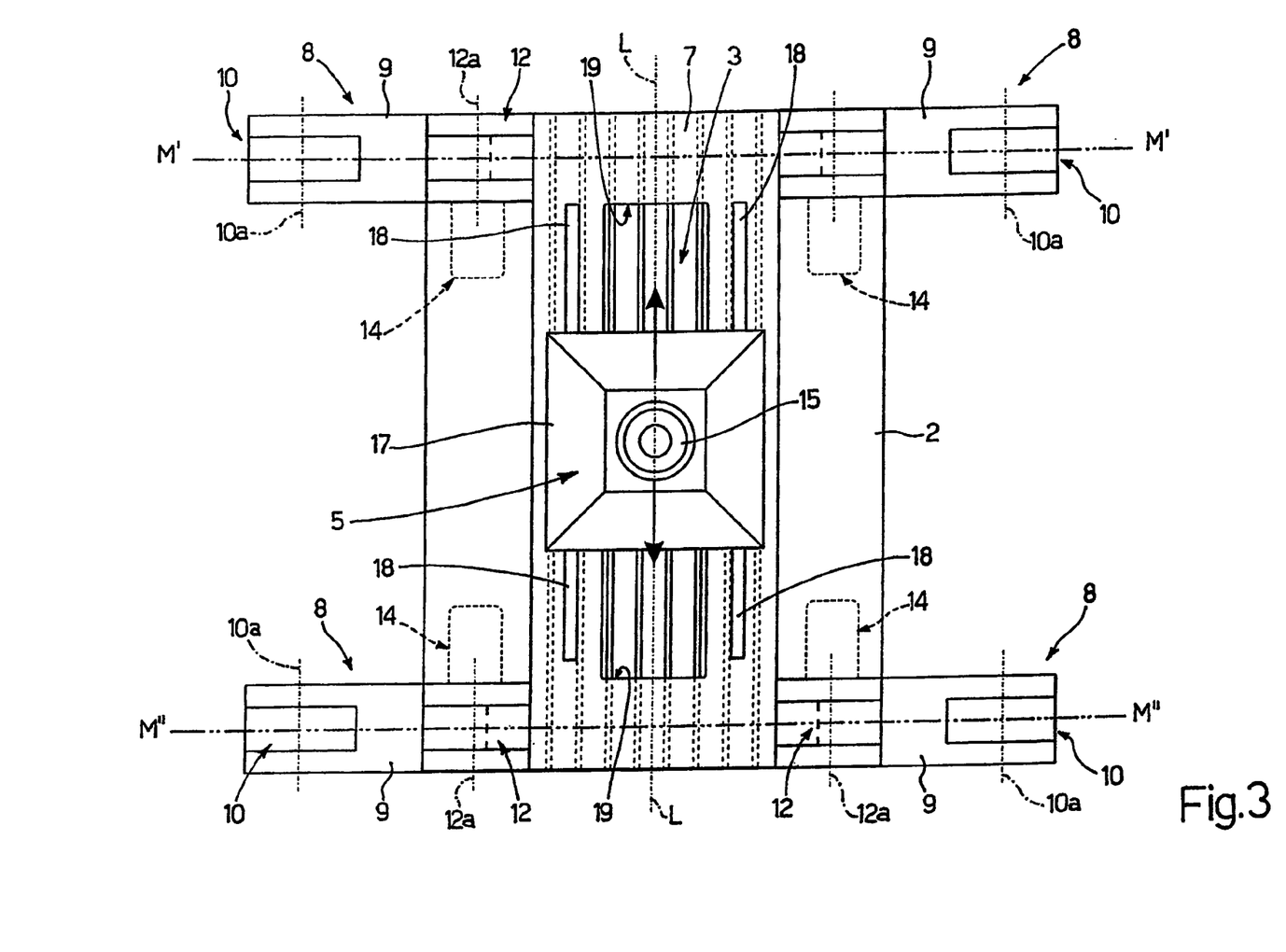
FIG. 3 is a plan view of the machine tool illustrated in FIGS. 1 and 2.

With reference to FIGS. 1, 2 and 3, number 1 designated as a whole a numeric-control machine that can advantageously be used to perform an extremely wide range of machining operations, such as, for example, machining operations for removal of stock and the like.

In the example illustrated, in particular, explicit reference will be made to a numeric-control machine tool 1 for milling of three-dimensional metal pieces with complex structure, without this however implying any loss of generality.

The machine tool 1 basically comprises: a bottom flatbed 2 provided with a horizontal working surface 3 on which a workpiece 4 is to be positioned; a cutterhead 5, which is able to move in space above the working surface 3 in such a way as to perform milling of the workpiece 4 stationary on the working surface 3; and a supporting structure 6, which is designed to support and displace the cutterhead 5 in space above the working surface 3 in such a way as to enable the latter to perform the required machining operations on the workpiece 4 that is stationary on the working surface 3.

Finally, the machine tool 1 is provided with a central control unit (not illustrated), which is designed to control the supporting structure 6 in such a way as to control the displacements of the cutterhead 5 above the working surface 3.

With reference to FIGS. 1, 2 and 3, unlike in currently known machine tools, the supporting structure 6 of the machine comprises a floating platform 7 mounted so that it can move above the working surface 3 of the machine, and a plurality of articulated supporting arms 8 of the pantograph or compass type, which are designed to support the floating platform 7 above the aforesaid working surface 3, on opposite sides of the platform itself.

In particular, in the example illustrated the floating platform 7 has a substantially rectangular shape and extends above the flatbed 2 throughout the length of the working surface 3.

With reference to FIGS. 1 and 3, the supporting structure 6 is instead provided with four articulated supporting arms 8 that are positioned at the four vertices of the floating platform 7, in such a way that each articulated arm 8 is able to connect a corresponding sharp edge of the floating platform 7 with the underlying flatbed 2. The four articulated arms 8 are moreover arranged in aligned pairs facing one another in such a way that each pair of articulated arms 8 is made up of two articulated arms 8 that lie and are mobile on one and the same vertical plane of movement M', M", which is perpendicular to the working surface 3 and to its longitudinal axis L.

In particular, with reference to FIGS. 1 and 2, each articulated arm 8 consists of two half-arms 9, which are preferably, but not necessarily, of the same length, lie on the vertical plane of movement M', M" above one other, and are hinged to one another at one end via a connection hinge 10, which enables the two half-arms 9 to rotate freely with respect to one another about a common axis of rotation 10a, which is perpendicular to the aforementioned vertical plane of movement M', M".

In addition to what has been described above, the bottom half-arm 9 has its own second end hinged to the flatbed 2 of the machine via a second connection hinge 11, which enables the bottom half-arm 9 to rotate freely with respect to the flatbed 2 about an axis of rotation 11a, which is parallel to the axis 10a, and hence perpendicular to the vertical plane of movement M' or M". Likewise, the top half-arm 9 has its second end hinged to the body of the floating platform 7 via a third connection hinge 12, which enables the top half-arm 9 to rotate freely with respect to the floating platform 7 about an axis of rotation 12a, which is parallel to the axes 10a and 11a.

In other words, each articulated arm 8 is made up of two half-arms 9, which are hinged to one another in such a way that the arm will be able to assume on the vertical plane of movement M' or M" a V-shaped configuration with an angle a of opening between the two half-arms having a value comprised between 0° and 180°, and are separately hinged one (i.e., the bottom half-arm 9) to the flatbed 2, in such a way as to be able to assume any inclined position with an angle of inclination β with respect to the vertical direction of between 0° and 120°, and the other (i.e., the top half-arm 9) to the body of the floating platform 7, in such a way as to be able to assume any inclined position with respect to the body of the aforesaid platform.

In addition to what has been described above, with reference to FIG. 1, the two articulated arms 8 that form each pair of articulated arms of the supporting structure 6 are arranged aligned to one another in a substantially specular configuration with respect to one another, in such a way that the six hinges 10, 11 and 12 belonging to the two articulated supporting arms 8 will be positioned in space at the vertices of a not necessarily regular hexagon.

Figure 4:
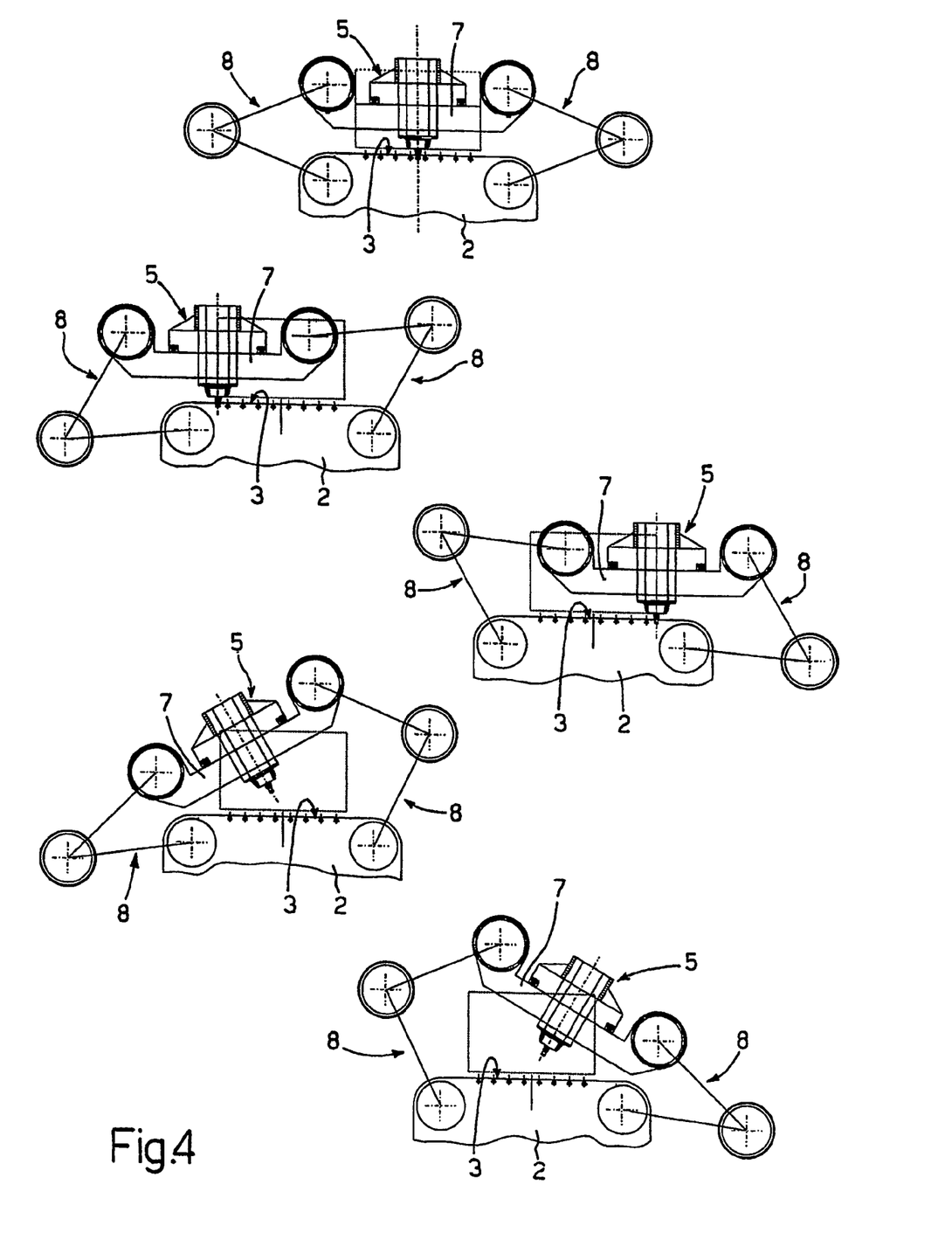
FIG. 4 is a schematic illustration of some possible configurations of operation of the machine tool illustrated in the preceding figures.

It should however be specified that the two articulated arms 8 that form each pair of articulated arms of the supporting structure 6 are mutually independent in their movement, and hence define with the floating platform 7 and the flatbed 2 a deformable articulated hexagon, which, during operation, can assume any spatial configuration amongst the ones illustrated in FIG. 4.

With reference to FIGS. 1, 2 and 3, each articulated arm 8 is finally provided with a series of members for moving that are able to rotate upon command the two half-arms 9 about the axes 10a, 11a and 12a, in such a way as to enable positioning of the articulated arm 8 on the vertical plane of movement M' or M" in any of the operative positions illustrated in FIG. 4.

In particular, in the example illustrated each articulated arm 8 is provided with two electric motors of the type with control of torque and speed (commonly referred to a "torque motors") with, associated thereto, the braking assembly and the angular-position sensor (more commonly referred to as "encoder"). One of these motors, designated by the reference number 13, is set in a position corresponding to the hinge 11 that connects the bottom half-arm 9 to the flatbed 4 and is able to rotate, upon command, the bottom half-arm 9 about the axis 11a. The other motor, designated by the number 14, is set in a position corresponding to the hinge 12 that connects the top half-arm 9 to the body of the floating platform 7 and is able to rotate, upon command, the top half-arm 9 about the axis 12a.

Of course, the members for moving can also be structured in a different way: for example, any of the electric motors 13 and 14 mounted on the hinges 11 and 12 can be replaced by a similar electric motor (not 25 illustrated) mounted in a position corresponding to the hinge 10. Alternatively, it is also possible to maintain the electric motors 13 and 14 in positions corresponding to the hinges 11 and 12 and install a third electric torque motor in a position corresponding to the hinge 10.

In a simplified embodiment, it is moreover possible to equip with the electric motors 13 and 14 only the two articulated arms 8 that form one of the two pairs of articulated arms of the supporting structure 6.

Finally, it should be emphasized that the electric motors 13 and 14 described above can be replaced by electric motor reducers of a traditional type, by hydraulic motors, by pneumatic motors or by any other type of driving unit designed for the purpose.

With reference to FIGS. 1, 2 and 3, the cutterhead 5 is instead mounted so that it can move on the floating platform 7 in a direction parallel to the longitudinal axis L of the working surface 3, and is basically made up of: a motor-spindle 15 (i.e., the ensemble consists of a tool-holder spindle and the corresponding actuation motor), mounted on the floating platform 7 in such a way as to have the tool-holder spindle 16 facing the flatbed 2 of the machine; and a structure 17 for supporting and moving the motor-spindle, which is able to displace, upon command and in a known way, the motor-spindle 15 in a direction parallel to the axis of rotation of the tool-holder spindle 16 so as to be able to move the tool-holder spindle 16 up to or away from the flatbed 2.

In particular, in the example illustrated, the structure 17 for supporting and moving the motor-spindle is mobile upon command along a pair of longitudinal guides 18 that extend above the floating platform 7 in a direction parallel to the longitudinal axis L of the working surface 3, and the motor-spindle 15 is mounted on the structure 17 for supporting and moving the motor-spindle in such a way as to project underneath the floating platform 7 slidably engaging a longitudinal through opening 19 made on the body of the floating platform 7 between the longitudinal guides 18, in a direction parallel to the longitudinal axis L of the working surface 3.

Of course, the central control unit (not illustrated) of the machine tool 1 supervises the displacements of the structure 17 for supporting and moving the motor-spindle along the floating platform 7 and the displacements of the motor-spindle 15 in a direction parallel to its axis of rotation.

The central control unit of the machine tool 1 is moreover able to drive the electric motors 13 and 14 according to the signals coming from the angular-position sensors integrated in the electric motors 13 and 14, in such a way as to displace the articulated arms 8 so that they can move the floating platform 7 up to or away from, or incline it or translate it horizontally with respect to the flatbed 2 and to its working surface 3 (see FIG. 4) to carry through the programmed machining operations.

Of course, the angular-position sensors or encoders that are integrated in the electric motors 13 and 14 enable determination of the absolute spatial position of the tool mounted on the cutterhead 5 in an indirect way. Consequently, the central control unit must calculate instant by instant the absolute spatial position of the tool mounted on the cutterhead 5, using a mathematical model of the supporting structure 6 of the machine.

It should, however, be pointed out that, as an alternative or in addition to the angular-position sensors integrated in the electric motors 13 and 14, the machine tool 1 can be provided with a device for detection of the absolute spatial position of the tool mounted on the cutterhead (not illustrated) of a known type, which is able to determine in real time the absolute spatial position of the tip of the tool mounted on the cutterhead 5 and its orientation in space. In this case, the central control unit of the machine tool 1 can control the displacements of the cutterhead 5 in a direct way, calculating in real time the movements that the articulated arms 8 must perform via a feedback control based directly on the absolute spatial position of the tool mounted on the cutterhead 5.

Operation of the machine tool 1 can be readily inferred from what has been described and illustrated above, and hence does not call for any further explanation.

The advantages that the machine tool 1 affords are evident. The new structure 6 for supporting the cutterhead 5 is much lighter than traditional portal ones, and hence has a moment of inertia considerably smaller than that of the latter, said moment of inertia enabling, given the same electric power applied, speeds of positioning of the cutterhead 5 to be reached which are unthinkable for current milling machines.

Of course, said increase in the speed of positioning of the cutterhead 5 results in a considerable increase in the output per hour of the machine.

The structure of the machine tool 1 further enables a wider range of movements of the cutterhead 5 to be achieved, so increasing considerably the versatility of the machine itself.

Finally, it is clear that modifications and variations may be made to the machine tool 1 described and illustrated herein, without thereby departing from the scope of the present invention.

Figure 5:
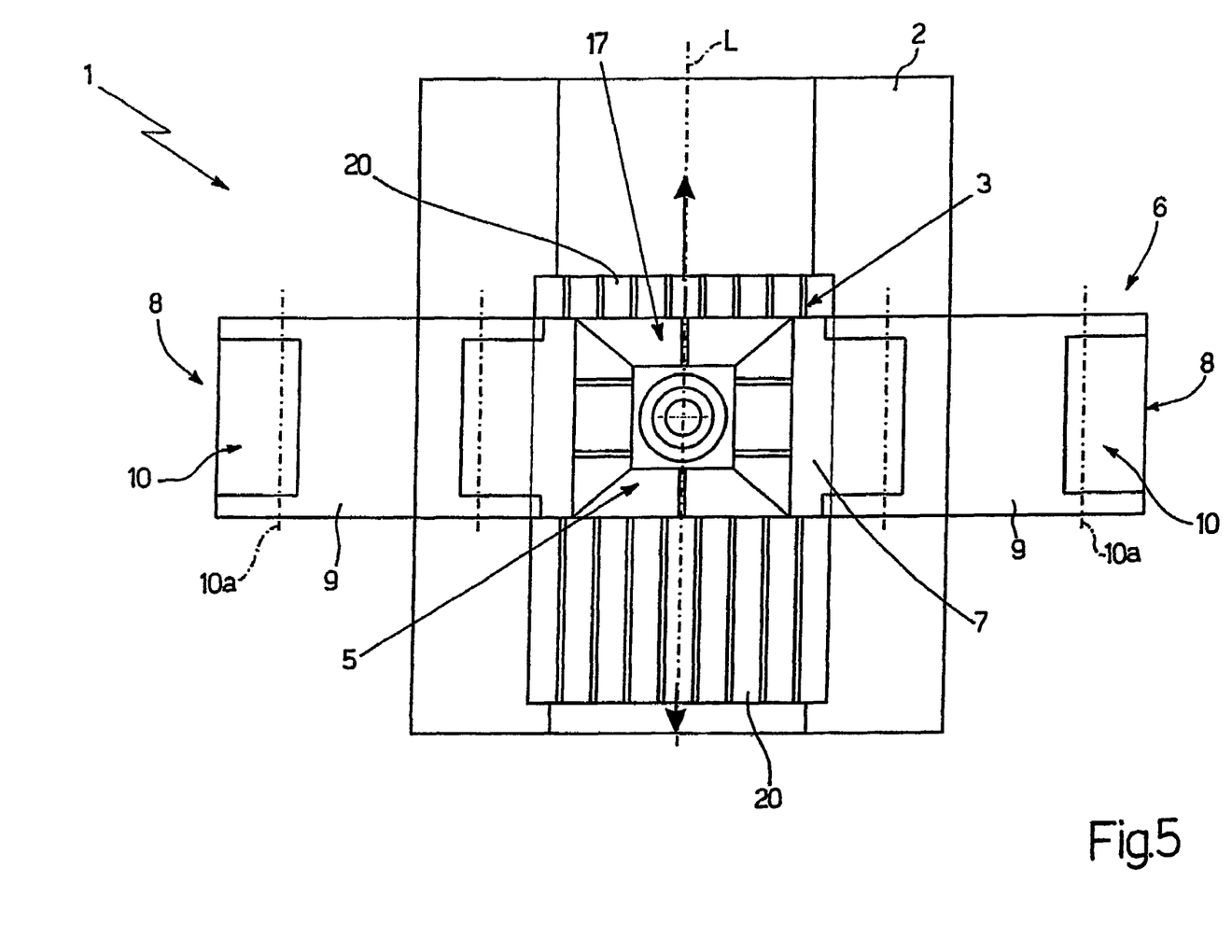
FIG. 5 is a plan view of a variant of the numeric-control machine tool illustrated in the preceding figures.

In particular, with reference to FIG. 5, the flatbed 2 can be provided at the top with a horizontal platform 20, on which the workpiece 4 is to be positioned. Said horizontal platform 20 is able to move upon command on the flatbed 2 in a direction parallel to the longitudinal axis L of the working surface 3, hence enabling installation of the cutterhead 5 on the floating platform 7 without any need to be able to translate upon command in a direction parallel to the aforesaid longitudinal axis L.

In this case, then, the structure 17 for supporting and moving the motor-spindle is fixed directly on the body of the floating platform 7 and is able only to displace the motor-spindle 15 in a direction perpendicular to the floating platform 7 and parallel to the axis of rotation of the tool-holder spindle 16, in such a way as to be able to move the tool-holder spindle 16 up to or away from the flatbed 2.

It is evident that the above solution enables a reduction in the longitudinal encumbrance of the floating platform 7 with respect to the solution illustrated in FIGS. 1 to 4. The floating platform 7 can now overlie just one portion of the working surface 3 and can thus be supported by just one pair of articulated arms 8 appropriately sized.

Finally, it should be specified that, in both of the solutions, the structure 17 for supporting and moving the motor-spindle can also be of a passive type, being limited to connecting the motor-spindle 15 rigidly to the body of the floating platform 7 without any possibility of movement.

As regards, instead, the motor-spindle 15, this can be replaced by a "water blade" cutting head, which uses a jet of water at a very high speed to cut into the material, by a laser cutting head, which uses a laser beam to cut into the material, by a drilling head or by any other type of machining head or detection device designed to be mounted on the bottom end of the turret of a traditional numeric-control machine.

The invention claimed is:

1. A numeric-control machine comprising a flatbed provided with: a horizontal working surface, on which a workpiece is to be positioned, a machining head, which is mobile in space above the working surface, and a supporting structure, which is designed to support and displace said machining head in space above the working surface, said supporting structure comprising a floating platform mounted mobile above the working surface, and a plurality of articulated supporting arms designed to support the floating platform above the aforesaid working surface on opposite sides of the platform, each articulated arm being mobile in a vertical plane and being designed to connect the flatbed of the machine with the overlying floating platform, each articulated arm comprising two half-arms hinged via a first connection hinge to enable the two half-arms to rotate about a first axis of rotation perpendicular to said vertical plane.

2. The machine according to claim 1, characterized in that said two half-arms of each articulated supporting arm are separately hinged one to the flatbed of the machine with a second connection hinge and the other to the body of the floating platform with a third connection hinge so as to be able to rotate freely about a respective second axis of rotation and a respective third axis of rotation parallel to said first axis of rotation.

3. The machine according to claim 2, characterized in that said plurality of articulated arms comprises at least one pair of articulated supporting arms that are arranged aligned and co-planar to one another in a substantially specular configuration with respect to one another, in such a way that said first connection hinge, said second connection hinge and said third connection hinge belonging to said two articulated supporting arms are positioned in space at the vertices of a hexagon.

4. The machine according to claim 3, characterized in that the articulated supporting arms that form each pair of articulated arms extend on one and the same plane of movement substantially perpendicular to the longitudinal axis of said working surface of the machine.

5. The machine according to claim 1, characterized in that it comprises means for movement which are able to move upon command the two half-arms of each articulated arm about said first axis of rotation, said second axis of rotation and said third axis of rotation independently of one another.

6. The machine according to claim 5, characterized in that said means for movement comprise at least one driving unit set in a position corresponding to said first connection hinge, said second connection hinge and/or said third connection hinge of the articulated arm.

7. The machine according to claim 1, characterized in that said floating platform is provided with a longitudinal through opening that extends in a direction parallel to the longitudinal axis of said working surface; the machining head being designed to slidably engage said longitudinal through opening.

* * * * *